(12) United States Patent
Hanley et al.

(10) Patent No.: US 11,038,550 B1
(45) Date of Patent: Jun. 15, 2021

(54) MULTI-RADIO SYNCHRONIZATION WITHIN A SINGLE CONNECTED SYSTEM

(71) Applicant: Landis+Gyr Innovations, Inc., Alpharetta, GA (US)

(72) Inventors: James Patrick Hanley, Decatur, GA (US); Christopher Scott Hett, Sandy Springs, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/887,695

(22) Filed: May 29, 2020

(51) Int. Cl.
| | |
|---|---|
| *H04B 1/71* | (2011.01) |
| *H04B 1/7143* | (2011.01) |
| *H04L 27/26* | (2006.01) |
| *H04B 1/7075* | (2011.01) |
| *H04W 84/20* | (2009.01) |

(52) U.S. Cl.
CPC ....... *H04B 1/7143* (2013.01); *H04B 1/70754* (2013.01); *H04L 27/2659* (2013.01); *H04W 84/20* (2013.01)

(58) Field of Classification Search
CPC .............. H04B 1/7143; H04B 1/70754; H04L 27/2659; H04W 84/20; H04W 24/00; H04W 56/0015; H04W 56/002; H04W 80/00; H04W 8/26; H04W 92/10; H04W 40/22; H04W 84/18; H04W 56/001; H04W 72/0446; H04W 84/10; H04W 84/12; H04W 28/18; H04W 36/0011; H04W 40/20; H04W 4/80; H04W 56/0005; H04W 56/0035; H04W 72/1205; H04W 74/08; H04W 4/02; H04W 52/0206; H04W 52/0216; H04W 72/08; H04W 84/22; H04W 92/20

See application file for complete search history.

(56) References Cited

U.S. PATENT DOCUMENTS

| | | | | |
|---|---|---|---|---|
| 2009/0257420 | A1* | 10/2009 | Kore | H04B 1/713 370/345 |
| 2016/0164726 | A1* | 6/2016 | Fraser | H04W 48/00 370/254 |
| 2018/0006681 | A1* | 1/2018 | Bi | H04B 1/715 |
| 2018/0198599 | A1* | 7/2018 | Mihelic | H04L 7/0033 |
| 2019/0044248 | A1* | 2/2019 | Keniuk | H01Q 19/13 |
| 2020/0077351 | A1* | 3/2020 | Porat | H04W 72/0446 |
| 2020/0259266 | A1* | 8/2020 | Keniuk | H01Q 1/24 |

* cited by examiner

*Primary Examiner* — Freshteh N Aghdam
(74) *Attorney, Agent, or Firm* — Kilpatrick Townsend & Stockton LLP

(57) ABSTRACT

A multi-radio border router for synchronizing communications of multiple border router radios is provided. For example, the border router includes a border router component connected to each of the plurality of border router radios. The border router component configured for selecting one of the plurality of border router radios as a master radio and assigning channel offset parameters for each of the plurality of border router radios. The master radio is configured for broadcasting synchronization beacons based on which the non-master radios synchronize their respective clocks with that of the master radio. After the synchronization, each of the border router radios communicates with endpoints associated therewith according to a channel hopping pattern modified by applying a channel offset determined based on the channel offset parameters assigned to the respective radio.

20 Claims, 6 Drawing Sheets

MULTI-RADIO SYNCHRONIZATION WITHIN A SINGLE CONNECTED SYSTEM

TECHNICAL FIELD

This disclosure generally relates to network communications, and more particularly relates to synchronizing multiple radios in a border router of a network.

BACKGROUND

Border routers are generally used to forward packets between autonomous networks. For example, in a mesh network connecting multiple smart devices (e.g., smart power, gas, and water meters), border routers are used to forward data packets from the smart meters to a headend system or from the headend system to the smart meters. A border router can have multiple border router radios. Currently, there are multiple personal area networks (PANs) used with a multi-radio border router. The number of PANs corresponds to the number of radios and each PAN operates independently of each other. Since the radio antennas are within feet of each other, there is constant interference between different PANs causing inefficient communications between the smart meters and the border router.

SUMMARY

Aspects and examples are disclosed for apparatuses and processes for synchronizing communications of multiple radios in a multi-radio border router of a network. In one example, a border router includes a plurality of border router radios each configured for communicating with one or more endpoints. The plurality of border router radios form a single person area network (PAN). The border router further includes a border router component connected to each of the plurality of border router radios. The border router component is configured for selecting one of the plurality of border router radios as a master radio and assigning channel offset parameters for each of the plurality of border router radios. The master radio is configured for broadcasting synchronization beacons and communicating with the one or more endpoints associated with the master radio according to a channel hopping pattern modified by applying a channel offset determined based on the channel offset parameters assigned to the master radio. Each of non-master radios of the plurality of border router radios is configured for synchronizing with the master radio based on the synchronization beacons and communicating with the one or more endpoints associated with the non-master radio according to the channel hopping pattern modified by applying another channel offset determined based on the channel offset parameters assigned to the non-master radio.

In another example, a method includes selecting, by a border router, one of a plurality of border router radios of the border router as a master radio, assigning, by the border router, channel offset parameters for each of the plurality of border router radios; broadcasting, by the master radio of the border router, synchronization beacons; synchronizing, by non-master radios of the plurality of border router radios of the border router, with the master radio based on the synchronization beacons; and communicating, by each of the plurality of border router radios of the border router, with one or more endpoints associated with the border router radio according to a channel hopping pattern and a channel offset determined based on the channel offset parameters assigned to the border router radio.

In a further example, a border router component is connected to a plurality of border router radios. The border router component includes a processor configured to execute computer-readable instructions, and a memory configured to store the computer-readable instructions that, when executed by the processor, cause the processor to perform operations. The operations include selecting one of the plurality of border router radios as a master radio and remaining border router radios of the plurality of border router radios as non-master radios. The operations further include determining channel offset parameters for each of the plurality of border router radios, and causing an identity of the master radio and the channel offset parameters to be transmitted to the respective border router radios. The channel offset parameters cause each of the plurality of border router radios to communicate with one or more endpoints associated with the border router radio according to a channel hopping pattern modified by applying a channel offset. The channel offset is determined based on the corresponding channel offset parameters. The operations further include configuring the non-master radios to synchronize with the master radio, and receiving, during a same timeslot, data from two or more of the plurality of border router radios. The data is received by the two or more border router radios from the one or more endpoints associated with the respective border router radios. The operations further include causing the received data to be transmitted to a headend system.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for synchronizing communications of multiple radios in a multi-radio border router of a network. For example, a border router containing multiple border router radios can select one of the border router radios as a master radio. The border router further assigns a channel offset (e.g., channel offset 0) to the master radio and determines channel offset parameters for the other radios (i.e., non-master radios). The channel offset parameters can be utilized to determine the channel offset for each of the non-master radio. For instance, the channel offset parameters can include an ordinal number assigned to a radio and the total number of border router radios in the border router. Based on these channel offset parameters, channel offset for a border router radio can be determined according to the number of channels available at the border router radio.

The border router can send the identity of the master radio and the channel offset parameters to the border router radios. The master radio can broadcast synchronization beacons using the assigned channel offset. Based on the synchronization beacons, the non-master radios can determine that the synchronization beacons are from the master radio and synchronize their respective clocks with that of the master radio. After the synchronization, each of the border router radios can communicate with endpoints associated with the respective border router radio based on the channel hopping pattern of the network (e.g., a channel hopping pattern according to the time-slotted channel hopping (TSCH) protocol for the PAN) and the determined channel offset.

Techniques described in the present disclosure increase the efficiency of network communication at the border router. By synchronizing the border router radios, all the border router radios of the border router can operate on the same PAN and use the same channel hopping pattern. The channel offsets applied to the border router radios allow the border router radios to offset the channels they operate on from each other, thereby reducing the interferences and channel collisions between the border router radios. As a result, endpoints associated with multiple border router radios can simultaneously or within the same timeslot communicate with their respective border router radios and these multiple border router radios can in turn simultaneously or within the same timeslot send data to the border router for transmission to the headend system. This increases the throughput of the network. Further, because of the low likelihood of channel interference and channel collision, a larger number of endpoints can be associated with a border router than existing approaches. Consequently, fewer border routers can be installed in the network thereby simplifying the structure of the network.

Exemplary Operating Environment

Figure 1:
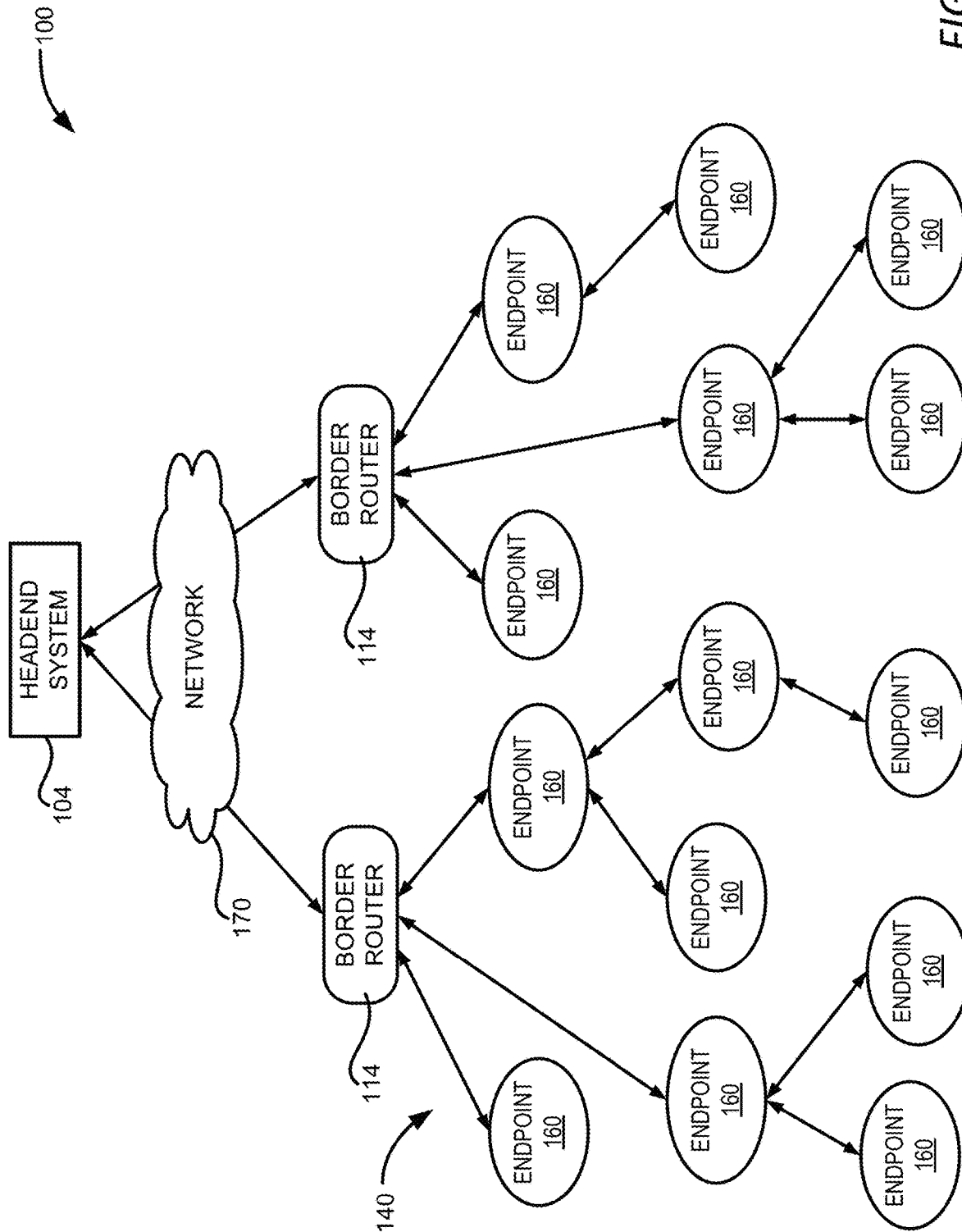
FIG. 1 is a block diagram showing an illustrative operating environment for synchronizing communications of multiple radios in a border router of a network, according to certain aspects of the present disclosure.

FIG. 1 is a block diagram showing an illustrative operating environment 100 for synchronizing communications of multiple radios in a border router of a network, according to certain aspects of the present disclosure. The environment 100 includes a mesh network 140 connecting endpoints 160 deployed at various geographical locations. For example, the mesh network 140 can be associated with a resource distribution system (e.g., an electrical power distribution system, a gas distribution system, or a water distribution system) for delivering measurement data obtained by the endpoints 160 (e.g., electrical, gas or water meters) in the resource distribution system. In this example, the endpoints 160 can be implemented to measure various operating characteristics of the resource distribution system, such as characteristics of resource consumption or other characteristics related to resource usage in the system.

The endpoints 160 can transmit the collected or generated data through the mesh network 140 to border routers 114. The border routers 114 of the mesh network 140 may be configured for collecting measurement data from the endpoints 116 and forwarding data to a headend system 104.

The border routers 114 may also communicate with the endpoints 160 to perform operations such as managing the endpoints 112, based on instructions received from the headend system 104. The border router 114 ultimately transmits the generated and collected measurement data to the headend system 104 via another network 170 such as the Internet, an intranet, or any other data communication network. The headend system 104 can function as a central processing system that receives streams of data or messages from the border routers 114. The headend system 104, or another system associated with a utility company, can process or analyze the collected data for various purposes, such as billing, performance analysis or troubleshooting.

Figure 2:
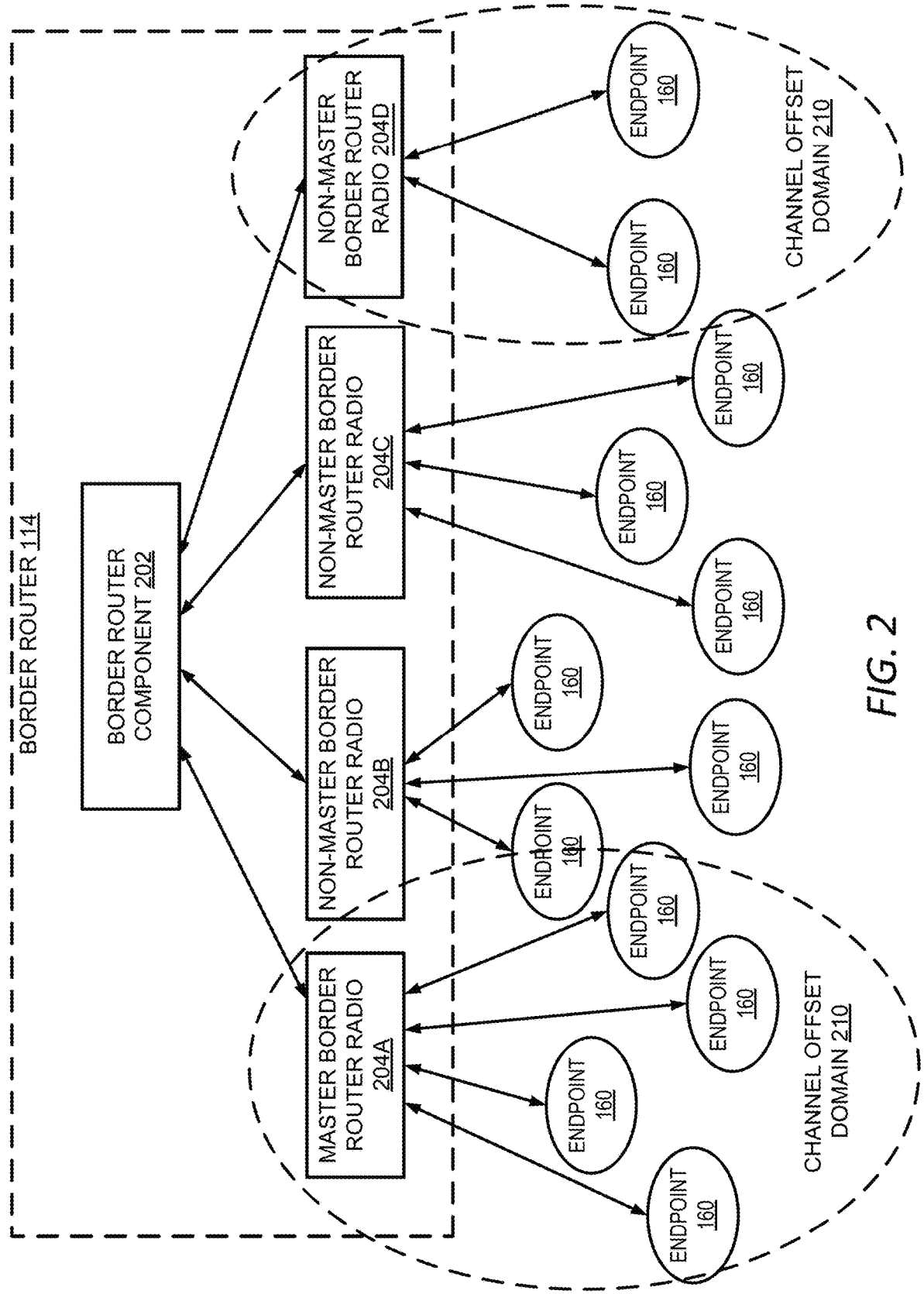
FIG. 2 is a block diagram showing an example of a border router, according to certain aspects of the present disclosure.

FIG. 2 is a block diagram showing an example of a border router 114, according to certain aspects of the present disclosure. In this example, the border router 114 includes a border router component 202 and multiple border router radios 204A-204D, which may be referred to herein individually as a border router radio 204 or collectively as the border router radios 204. The border router component 202 may be connected to each of the border router radios 204 through, for example, a serial connection, such as a USB connection. The border router component 202 may receive data from the border router radios 204 and forward them to the headend system 104. Similarly, the border router component 202 may also receive data from the headend system 104, such as endpoint configuration instructions, and forward them to one or more border router radios 204 for transmitting to the destination endpoints.

Each border router radio 204 may be in communication with one or more endpoints 160 in the mesh network 140. The border router radio and its associated endpoints 160 form a channel offset domain 210. As such, the mesh network 140 can include multiple channel offset domains 210 corresponding to the multiple border router radios 204. The mesh network 140 may follow a time-slotted channel hopping (TSCH) communication protocol to communicate data and network management messages within the network. The nodes within a PAN may be synchronized on a current TSCH timeslot. Each timeslot in the TSCH protocol has a time duration of duration "T" which can be defined in milliseconds or other appropriate time units. The TSCH protocol also uses multiple channel frequencies for communication between devices in the network. A channel hopping pattern defines the channel used to communicate during each timeslot for a node in the TSCH network. For example, a channel hopping pattern may determine that channel 4 is associated with timeslot 1 and channel 6 is associated with timeslot 2. A node can thus determine, based on the channel hopping pattern, that it should switch to channel 4 during timeslot 1 and switch to channel 6 during timeslot 2. The channel hopping pattern may have a hopping pattern length L and the channel hopping pattern repeats for every L timeslots.

To reduce the interference between the border router radios 204, the border router component 202 can configure the border router radios 204 so that the channels used by the border router radios 204 for communication at a given timeslot are different and are spaced apart. This also helps to reduce the constant churn of nodes switching PANs. Because in the existing approach, multiple PANs are supported by the same border router, a node may tend to detect communications from another PAN, leave the current PAN and joint a new PAN. This can lead to inefficiencies if the switching happens too often. By synchronizing the border router radios 204 so that their channels at a given timeslot are different and are spaced apart, this problem can be reduced.

To do so, the border router component 202 may configure the border router radios 204 to be synchronized and operate in the same PAN so that the channels used at different border router radios 204 are offset from each other. More specifically, the border router component 202 can select one of the border router radios 204 as the master radio and configure the master radio to broadcast synchronization beacons. The border router component 202 can further configure the non-master border router radios 204 to synchronize with the master radio based on the synchronization beacons.

The border router component 202 can further determine channel offset parameters for each of the border router radios 204. The channel offset parameters can be utilized to determine the channel offset for offsetting or adjusting the channel hopping patterns at the respective border router radios 204. In some examples, the border router component 202 can determine the channel offset for each of the border router radios 204 and include the channel offset in the channel offset parameters transmitted to the corresponding border router radio 204. Alternatively, or additionally, the border router component 202 can assign an ordinal number to each of the border router radios 204 and include the ordinal number and the total number of border router radios 204 in the channel offset parameters. Based on the channel offset parameters and other information available at the border router radio 204, the border router radio 204 can calculate its channel offset. For instance, a border router radio 204 can determine its channel offset as follows:

$$Ch_{offset\_i} = \lfloor N_c \times i / N_r \rfloor \quad (1)$$

Here, $N_r$ is the total number of border router radios 204 in the border router 114; i is the ordinal number of the border router radio 204 and $0 \le i \le N_r - 1$. $N_c$ is the total number of channels available at each border router radio 204. $\lfloor x \rfloor$ is a floor function that outputs the least integer number greater than or equal to its input x.

The channel offset determination shown in Eqn. (1) allows the channels used by different border router radios 204 in the same timeslot to be spread over the available channels. In some implementations, the ordinal number assigned to the master radio is 0 and thus its channel offset is also 0. It should be understood that the method of determining the channel offset for a border router radio 204 shown in Eqn. (1) is for illustration purposes only and should not be construed as limiting. Various other ways of determining the channel offsets for the border router radios 204 can be utilized as long as the channel offsets for different border router radios 204 are different.

Figure 3:
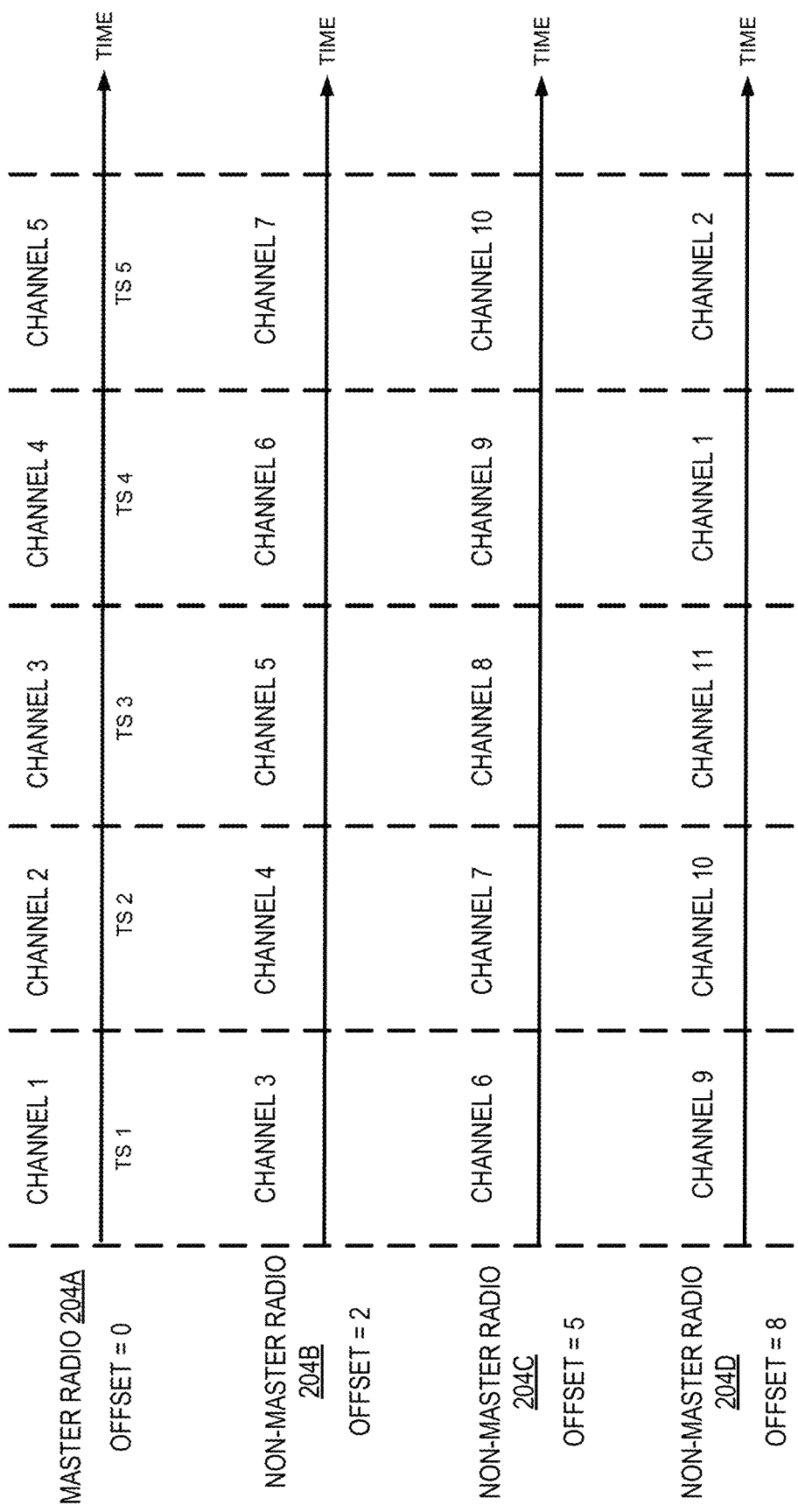
FIG. 3 shows examples of channel hopping patterns for different border router radios in a border router, according to certain aspects of the present disclosure.

Based on the determined channel offset, a border router radio r can offset its channel hopping pattern by the amount specified by its channel offset $Ch_{offset\_r}$. For example, if the channel hopping pattern indicates that channel y is to be used at a given timeslot, the border router radio r may determine its channel for communication at the given timeslot is $y + Ch_{offset\_r}$. FIG. 3 shows examples of channel hopping patterns for different border router radios 204 in a border router 114, according to certain aspects of the present disclosure.

In the example shown in FIG. 3, the channel hopping pattern 302 for the PAN has a hopping pattern length 5 and indicates that channel 1 is associated with timeslot 1, channel 2 is associated with timeslot 2, channel 3 is associated with timeslot 3, channel 4 is associated with timeslot 4, and channel 5 is associated with timeslot 5. Given this channel hopping pattern, border router radios 204 can determine the channel hopping patterns used in the individual channel offset domains based on their respective channel offsets. These channel hopping patterns after applying the channel offsets are the effective channel hopping patterns at the respective border router radios 204. In this example, the effective channel hopping pattern for the channel offset domain associated with the master radio 204A is the same as the channel hopping pattern 302 because the master radio 204A has a channel offset 0. The effective channel hopping pattern for the channel offset domain associated with the non-master radio 204B is generated by offsetting the channel hopping pattern 302 by 2 (i.e. the channel offset for non-master radio 204B) and it becomes: channel 3 is associated with timeslot 1, channel 4 is associated with timeslot 2, channel 5 is associated with timeslot 3, channel 6 is associated with timeslot 4, and channel 7 is associated with timeslot 5. The effective channel hopping pattern for channel offset domains associated with other border router radios 204 can be determined similarly. In some implementations, instead of determining the effective channel hopping pattern at individual border router radios, the channels to be used by the border router radios are determined on a timeslot by timeslot basis. In other words, a border router radio determines the channel for a given timeslot by applying the channel offset to the channel assigned to the timeslot according to the channel hopping pattern. The border router radio can repeat this operation for each timeslot that the border router radio is active.

If, after applying the channel offset, the channel number exceeds the maximum number of available channels, the channel number can be rolled back to channel 1. In other words, the new channel number after applying a channel offset $Ch_{offset}$ on a current channel number y becomes $(y + Ch_{offset\_r})$ mod $N_c$, where $N_c$ is the total number of available channels and mod denotes the modulo operation. For example, for border router radio 204D, the channel associated with timeslot 4 becomes channel 1 because applying channel offset 8 on channel 4 leads to channel 12 exceeding the total number of 11 channels available at the border router radios 204 in this example. Likewise, the channel associated with timeslot 5 becomes channel 2 instead of channel 13. It should be understood that the number of available channels may vary. For example, in some regions, there can be 64 available channels. The technology presented herein is applicable for implementations with any number of available channels.

The effective channel hopping pattern determined at a border router radio 204 is used by all the endpoints in the corresponding channel offset domain 210. The border router radio 204 can inform the endpoints 160 in its channel offset domain 210 of the channel offset so that the endpoints 160 can determine the corresponding channel for use in a given timeslot. From FIG. 3, it can be seen that at a given timeslot, the multiple border router radios 204 operate on different channels and these different channels spread over the available channels of the border router radios 204. For example, at timeslot 2, the master border router radio 204A operates on channel 2, and the non-master border router radios 204B-204D operate on channels 4, 7, and 10, respectively. The channels of the border router radios 204 are spread over the 11 available channels and are not adjacent to each other. In this way, the interference between the communications of the border router radios 204 is reduced. Similarly, network collisions (i.e., two radios try to communicate on the same channel) are also reduced though they might not be eliminated. To detect and avoid network collisions, channel collision avoidance mechanism, such as clear channel assessment (CCA), can be utilized to detect the channel use before transmitting on that channel.

Figure 4:
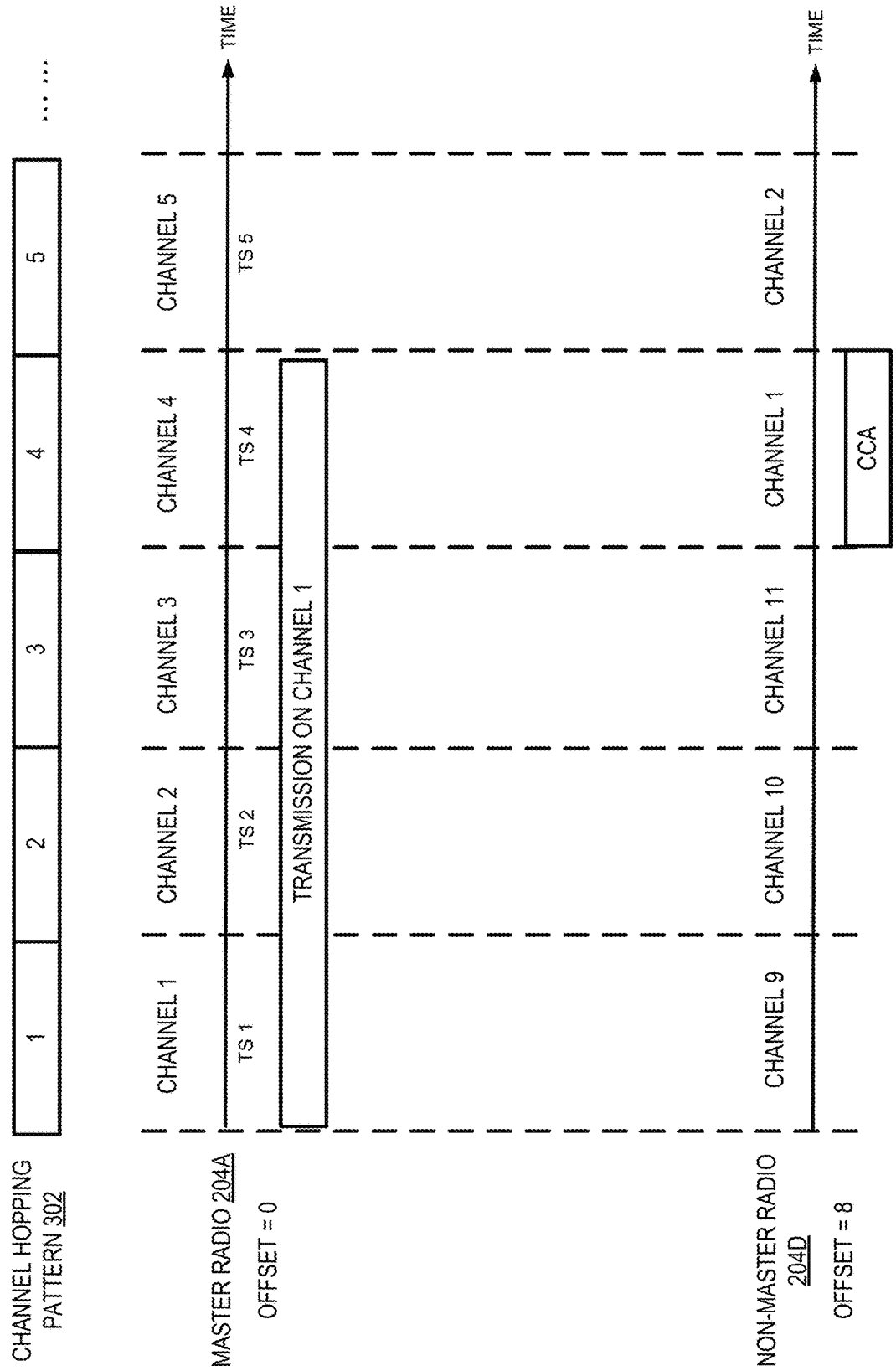
FIG. 4 shows an example of a communication collision between different border router radios, according to certain aspects of the present disclosure.

FIG. 4 shows an example scenario where a channel collision might occur when the channel hopping pattern and the channel offsets shown in FIG. 3 are used. In this example, the border router radios 204 and the endpoints 160 in the respective channel offset domains communicate according to the TSCH protocol. Under this protocol, if a node starts to transmit or receive packets on a channel in a timeslot and does not finish the communication in that timeslot, it may continue the communication over the following timeslots on the same channel. In the example shown in FIG. 4, the master radio 204A started to transmit packets on channel 1 in timeslot 1 and continued the transmission over the following timeslots until the end of timeslot 4. During this time period, the master radio 204A remained on channel 1 associated with timeslot 1.

For border router radio 204D, however, according to the channel hopping pattern 302 and the channel offset determined for this radio, the channel that border router radio 204D should switch to at timeslot 4 is also channel 1. Transmission by the border router radio 204D transmits on channel 1 will cause a channel collision with master radio 204A. To avoid such channel collisions, each of the border router radios 204 may be configured to implement a channel collision avoidance mechanism, such as the CCA, to detect before transmission whether the channel that the radio switches to is in use by other radios. In the example of FIG. 4, the border router radio 204D can detect, at the timeslot 4, that border router radio 204A is using channel 1, and thus refrain from transmitting data on that channel. Upon detecting the collision, the border router radio 204D can push the transmission task into a queue and carry out the transmission at a later time when there is an available channel. It should be noted that the available channel used at the later time for transmission may be a different channel from the channel where the collision was detected.

Figure 5:
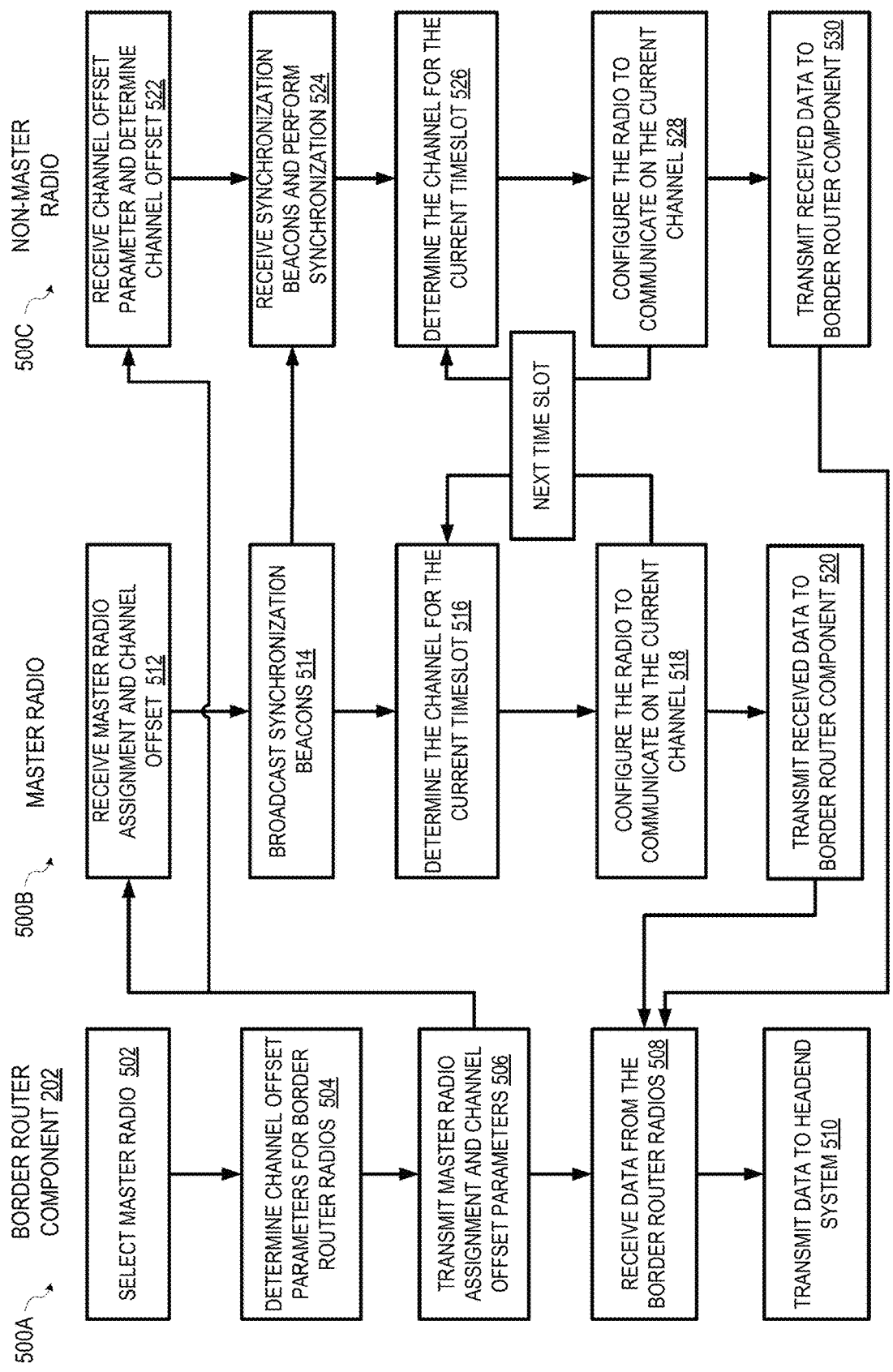
FIG. 5 shows an example of a process for synchronizing the communications of the multiple border router radios in a multi-radio border router, according to certain aspects of the disclosure.

Referring now to FIG. 5, FIG. 5 includes several flow diagrams that illustrate several processes 500A, 500B, and 500C for synchronizing communications of multiple radios in a multi-radio border router of a network, according to certain aspects of the disclosure. In particular, the process 500A illustrates aspects of the border router component 202 of a border router 114, the process 500B illustrates aspects of the master radio of the border router 114 (such as master radio 204A), and the process 500C illustrates aspects of a non-master radio of the border router 114, such as border router radio 204B. The border router component 202, the master radio, and the non-master border router radio can implement operations in process 500A, 500B, and 500C, respectively by executing suitable program code. The processes 500A, 500B and 500C will be described together below. For illustrative purposes, the processes 500A, 500B, and 500C are described with reference to certain examples depicted in the figures. Other implementations, however, are possible.

At block 502, the process 500A involves the border router component 202 of the border router 114 selecting one of its associated border router radios 204 as the master radio. At block 504, the process 500A involves determining channel offset parameters for each of the border router radios 204 of the border router 114. The channel offset parameters can be utilized to determine the channel offset for offsetting the channel hopping patterns at the respective border router radios 204. In some examples, the border router component 202 can determine the channel offset for each of the border router radios 204 and include the channel offset in the channel offset parameters for the corresponding border router radio 204. Alternatively, or additionally, the border router component 202 can assign an ordinal number to each of the border router radios 204 and include the ordinal number and the total number of border router radios 204 in the border router 114 in the channel offset parameters. In some implementations, the border router component 202 assigns channel offset 0 for the master radio.

At block 506, the process 500A involves transmitting the channel offset parameters to the respective border router radios 204. In some implementations, the border router radios 204 are connected to the border router component 202 through respective internal serial connections, such as USB connections. The channel offset parameters can be transmitted to a border router radio 204 (the master radio or a non-master radio) through the corresponding internal serial connection as administrative commands. In some examples, the border router component 202 may also transmit the identity of the master radio and the channel offset of the master radio to the border router radios 204 so that each border router radio 204 is aware of the master radio and its channel offset. This information can be used to properly configure the respective border router radios 204 as a master radio or a non-master radio.

At block 512, the process 500B involves the master radio 204A receiving the master radio assignment and the channel offset assigned to the master radio. Based on this information, the master radio can be configured as a master radio. At block 514, the process 500B involves the master radio 204A generating and broadcasting synchronization beacons according to its channel offset. The synchronization beacons can be utilized by other radios to synchronize their respective clocks with that of the master radio. The synchronization beacons also contain information that can be utilized by other radios to determine the correct timeslot that the master radio operates in.

At block 516, the process 500B involves the master radio 204A determining the channel for the current timeslot according to the channel hopping pattern used in the PAN. In some implementations, the channel hopping pattern is determined by the master radio. As discussed above in detail with respect to FIG. 3, the channel for the current timeslot at a border router radio 204 can be determined as the channel specified in the channel hopping pattern modified by applying the channel offset of the border router radio 204. At block 518, the process 500B involves the master radio 204A configuring itself to communicate with endpoints in its channel offset domain using the determined channel. In some implementations, the master radio 204A also implements a channel collision avoidance mechanism, such as CCA, to detect channel usage before transmitting data on the determined channel. Blocks 516 and 518 can be repeated for each timeslot. At block 520, the process 500B involves the master radio 204A transmitting data received from the endpoints in its channel offset domain to the border router component 202.

At block 522, the process 500C involves a non-master radio 204 receiving its channel offset parameters from the border router component 202 and determining its channel offset. The border router radio 204 may also receive other information from the border router component 202, such as the identity of the master radio and the channel offset assigned to the master radio. If the channel offset parameters include the channel offset, then the border router radio 204 can use that channel offset directly. If the channel offset parameters do not include the channel offset, the border router radios 204 can derive its channel offset based on the channel offset parameters. For example, the border router component 202 can assign an ordinal number to each of the border router radios 204 and include the ordinal number and the total number of border router radios 204 in the border router 114 in the channel offset parameter. Based on the information contained in the channel offset parameters and additional information available at the border router radio 204, such as the total number of available channels, the border router radio 204 can calculate its channel offset, for example, by using Eqn. (1).

At block 524, the process 500C involves the non-master radio 204 receiving synchronization beacons from the master radio and performing synchronization with the master radio according to the synchronization beacons. The border router radios 204 can recognize the synchronization beacons are from the master radio based on the channel and the timeslot when the synchronization beacons were received. After the border router radios 204 recognize that the synchronization beacons are from the master radio, they can perform the synchronization accordingly. As a result, the non-master radio 204 is able to accurately determine the start and the end of the current timeslot of the master radio. At block 526, the process 500C involves the non-master radio 204 determining the channel for the current timeslot. Similar to block 516, the non-master radio 204 can determine its channel for the current timeslot as the channel specified for the current timeslot in the channel hopping pattern of the network modified by applying the channel offset of the non-master radio 204. At block 528, the process 500C involves the non-master radio 204 configuring itself to communicate with endpoints in its channel offset domain using the determined channel. Similar to the master radio, the non-master radio 204 may also implement the channel collision avoidance mechanism, such as CCA, to detect channel usage before transmitting data on the determined channel. Blocks 526 and 528 can be repeated for each timeslot. At block 530, the process 500C involves the non-master radio 204 transmitting data received from the endpoints to the border router component 202.

Because the communication of the border router radios 204 are synchronized and the communication channels for different border router radios are offset from each other, the communications in different channel offset domains can be performed simultaneously or in the same timeslot. Likewise, the transmissions in blocks 520 and 530 can also be performed simultaneously or in the same timeslot. Therefore, the efficiency of the mesh network 140 is significantly increased.

At block 508, the process 500A involves the border router component 202 receiving the data from the border router radios 204 and at block 510, the process 500A involves the border router component 202 transmitting the received data to the headend system 104 via the network 170.

It should be noted that while the above description describes the channel offsets being positive, the channel offsets can also be negative. That is, the channel number for a given border router radio at a timeslot can be determined as the channel number specified in the channel hopping pattern minus the channel offset for that border router radio. In addition, TSCH is described above merely as an example of the network protocol used in the mesh network 140 and should not be construed as limiting. The described synchronization technology is also applicable to other network protocols such as Wi-SUN CSMA-CA.

Exemplary Border Router

Figure 6:
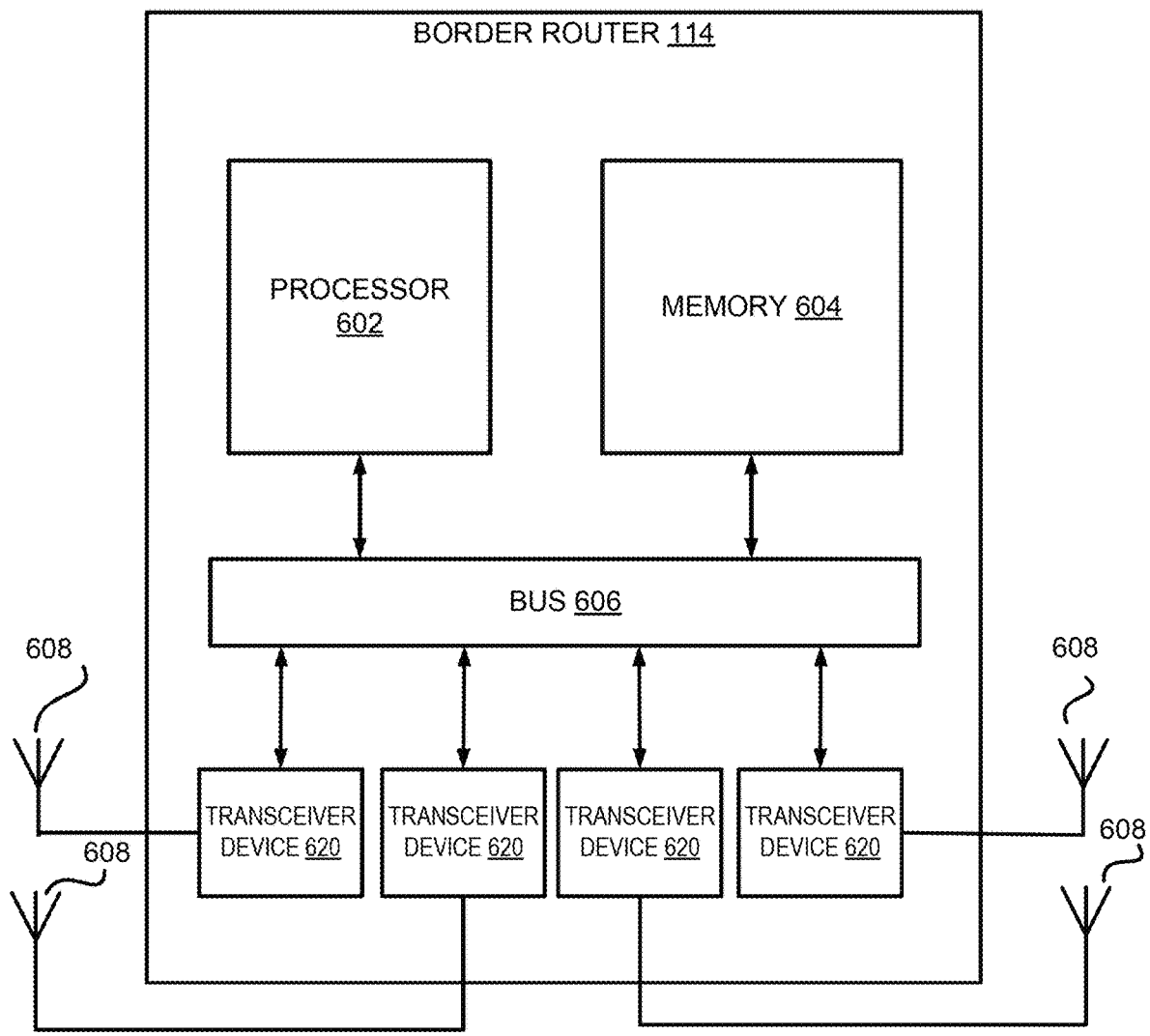
FIG. 6 is a block diagram depicting an example of a border router suitable for implementing aspects of the techniques and technologies presented herein.

FIG. 6 is a block diagram illustrating an example of a border router 114 with multiple border router radios 204 implementing the communication synchronization among the multiple border router radios 204. The border router 114 can include a processor 602. Non-limiting examples of the processor 602 include a microprocessor, an application-specific integrated circuit (ASIC), a state machine, a field programmable gate array (FPGA) or other suitable processing device. The processor 602 can include any number of processing devices, including one. The processor 602 can be communicatively coupled to non-transitory computer-readable media, such as memory device 604. The processor 602 can execute computer-executable program instructions and/or access information stored in the memory device 604. The processor 602 and the memory device 604 may be part of the border router component 202.

The memory device 604 can store instructions that, when executed by the processor 602, causes the processor 602 to perform operations described herein for the border router component 202. The memory device 604 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The border router 114 can also include a bus 606. The bus 606 can communicatively couple one or more components of the border router 114. Although the processor 602, the memory device 604, and the bus 606 are respectively depicted in FIG. 6 as separate components in communication with one another, other implementations are possible. For example, the processor 602, the memory device 604, and the bus 606 can be respective components of respective printed circuit boards or other suitable devices that can be disposed in border router 114 to store and execute programming code.

The border router 114 can also include multiple transceiver devices 620 (such as border router radios 204) communicatively coupled to the processor 602 and the memory device 604 via the bus 606. Non-limiting examples of a transceiver device 620 include an RF transceiver and other transceivers for wirelessly transmitting and receiving signals. The transceiver device 620 is capable of communicating with endpoints 160 in the respective channel offset domains via their respective antennas 608. While four transceiver devices are shown for illustrative purposes, other aspects include more or fewer transceiver devices. In addition, while FIG. 6 shows that the transceivers 620 are internal to the border router 114, one or more of the transceivers 620 can be external to the border router 114 and connected to the border router 114 through, for example, a serial connection, such as a USB connection.

General Considerations

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A border router, comprising:
   a plurality of border router radios each configured for communicating with one or more endpoints, the plurality of border router radios forming a single person area network (PAN); and
   a border router component connected to each of the plurality of border router radios, the border router component configured for:
      selecting one of the plurality of border router radios as a master radio; and
      assigning channel offset parameters for each of the plurality of border router radios;
   wherein the master radio is configured for:
      broadcasting synchronization beacons; and
      communicating with the one or more endpoints associated with the master radio according to a channel hopping pattern modified by applying a channel offset determined based on the channel offset parameters assigned to the master radio; and
   wherein each of non-master radios of the plurality of border router radios is configured for:
      synchronizing with the master radio based on the synchronization beacons; and
      communicating with the one or more endpoints associated with the non-master radio according to the channel hopping pattern modified by applying another channel offset determined based on the channel offset parameters assigned to the non-master radio.

2. The border router of claim 1, wherein:
   the channel offset parameters for the border router radio comprise an ordinal number of the border router radio and a total number of border router radios associated with the border router, and
   the channel offset for the border router radio is determined based on the ordinal number of the border router radio, the total number of border router radios, and a total number of channels available at the border router radio.

3. The border router of claim 1, wherein the channel offset parameters for the border router radio comprise the channel offset of the border router radio and is transmitted to the border router radio by the border router component.

4. The border router of claim 1, wherein the plurality of border router radios are further configured to transmit data to the border router component in a same timeslot.

5. The border router of claim 1, wherein communicating with the one or more endpoints associated with a border router radio according to the channel hopping pattern modified by applying a channel offset comprises communicating with one of the one or more endpoints on a channel at a given timeslot, wherein a channel number of the channel is determined as a channel number specified in the channel hopping pattern for the given timeslot adjusted by the channel offset.

6. The border router of claim 1, wherein the channel offset for each of the plurality of border router radios is different.

7. The border router of claim 1, wherein the master radio is further configured to determine the channel hopping pattern according to a time-slotted channel hopping (TSCH) protocol.

8. The border router of claim 1, wherein said each of the plurality of border router radios is configured to perform clear channel assessment before transmitting on a channel determined according to the channel hopping pattern and the channel offset for the border router radio.

9. A method, comprising:
   selecting, by a border router, one of a plurality of border router radios of the border router as a master radio;
   assigning, by the border router, channel offset parameters for each of the plurality of border router radios;
   broadcasting, by the master radio of the border router, synchronization beacons;
   synchronizing, by non-master radios of the plurality of border router radios of the border router, with the master radio based on the synchronization beacons; and
   communicating, by each of the plurality of border router radios of the border router, with one or more endpoints associated with the border router radio according to a channel hopping pattern and a channel offset determined based on the channel offset parameters assigned to the border router radio.

10. The method of claim 9, wherein:
- the channel offset parameters for the border router radio comprise an ordinal number of the border router radio and a total number of border router radios associated with the border router, and
- the channel offset for the border router radio is determined based on the ordinal number of the border router radio, the total number of border router radios, and a total number of channels available at the border router radio.

11. The method of claim 9, wherein the plurality of border router radios form a single person area network (PAN).

12. The method of claim 9, wherein the plurality of border router radios are further configured to transmit data to the border router in a same timeslot.

13. The method of claim 9, wherein communicating with one or more endpoints associated with the border router radio according to a channel hopping pattern and a channel offset comprises communicating with one of the one or more endpoints on a channel at a given timeslot, wherein a channel number of the channel is determined as a channel number specified in the channel hopping pattern for the given timeslot adjusted by the channel offset.

14. The method of claim 9, wherein the channel offset for each of the plurality of border router radios are different.

15. The method of claim 9, further comprising:
- performing, by each of the plurality of border router radios, clear channel assessment before transmitting on a channel determined according to the channel hopping pattern and the channel offset for the border router radio.

16. A border router component connected to a plurality of border router radios, the border router component comprising:
- a processor configured to execute computer-readable instructions; and
- a memory configured to store the computer-readable instructions that, when executed by the processor, cause the processor to perform operations comprising:
  - selecting one of the plurality of border router radios as a master radio and remaining border router radios of the plurality of border router radios as non-master radios;
  - determining channel offset parameters for each of the plurality of border router radios;
  - causing an identity of the master radio and the channel offset parameters to be transmitted to a respective border router radio of the plurality of border router radios, wherein the channel offset parameters cause each of the plurality of border router radios to communicate with one or more endpoints associated with the border router radio according to a channel hopping pattern modified by applying a channel offset, the channel offset being determined based on the channel offset parameters for the border router radio;
  - configuring the non-master radios to synchronize with the master radio;
  - receiving, during a same timeslot, data from two or more of the plurality of border router radios, the data being received by the two or more border router radios from the one or more endpoints associated with the respective border router radios; and
  - causing the received data to be transmitted to a headend system.

17. The border router component of claim 16, wherein
- the channel offset parameters for the border router radio comprise an ordinal number of the border router radio and a total number of border router radios connected to the border router component; and
- the channel offset for the border router radio is determined by the border router radio based on the ordinal number of the border router radio, the total number of border router radios, and a total number of channels available for communication at the border router radio.

18. The border router component of claim 16, wherein the channel offset parameters for the border router radio comprise the channel offset of the border router radio and is transmitted to the border router radio through an administrative command.

19. The border router component of claim 16, wherein the operations further comprise configuring the plurality of border router radios to form a single person area network (PAN).

20. The border router component of claim 16, wherein the channel offsets for the plurality of border router radios are different.

* * * * *